United States Patent
Kawanishi et al.

(10) Patent No.: US 6,865,207 B1
(45) Date of Patent: Mar. 8, 2005

(54) SEMICONDUCTOR LASER DEVICE WITHSPOT-SIZE CONVERTER AND METHOD FOR FABRICATING THE SAME

(75) Inventors: Hidenori Kawanishi, Nara (JP); Atsushi Shimonaka, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/466,174

(22) Filed: Dec. 17, 1999

(30) Foreign Application Priority Data

Dec. 18, 1998 (JP) .......................... 10-360100

(51) Int. Cl.[7] .............. H01S 5/00; G02B 6/12
(52) U.S. Cl. ................ 372/50; 385/14; 385/50; 385/132
(58) Field of Search ................ 372/50; 385/14, 385/50, 132

(56) References Cited

U.S. PATENT DOCUMENTS

| | | | | |
|---|---|---|---|---|
| 5,175,643 A | * | 12/1992 | Andrews | 359/339 |
| 5,228,049 A | * | 7/1993 | Paoli | 372/50 |
| 5,875,274 A | * | 2/1999 | Stein | 385/49 |
| 5,912,910 A | * | 6/1999 | Sanders et al. | 372/22 |
| 5,926,585 A | * | 7/1999 | Irikawa et al. | 385/14 |
| 6,163,631 A | * | 12/2000 | Kawanishi et al. | 385/14 |
| 6,480,640 B1 | * | 11/2002 | Shimonaka et al. | 385/14 |
| 6,597,823 B2 | * | 7/2003 | Shimonaka et al. | 385/14 |

FOREIGN PATENT DOCUMENTS

| JP | 62159489 | 7/1987 |
|---|---|---|
| JP | 1114842 | 1/1999 |

* cited by examiner

*Primary Examiner*—Don Wong
*Assistant Examiner*—James Menefee
(74) *Attorney, Agent, or Firm*—Birch, Stewart, Kolasch & Birch, LLP

(57) ABSTRACT

A semiconductor laser device with a spot-size converter includes at least a semiconductor laser region emitting light from an end facet thereof and a light waveguide region. The semiconductor laser region and the light waveguide region are integrated on a semiconductor substrate in a horizontal direction. A semiconductor layer is buried in a junction region between the semiconductor laser region and the light waveguide region.

19 Claims, 15 Drawing Sheets

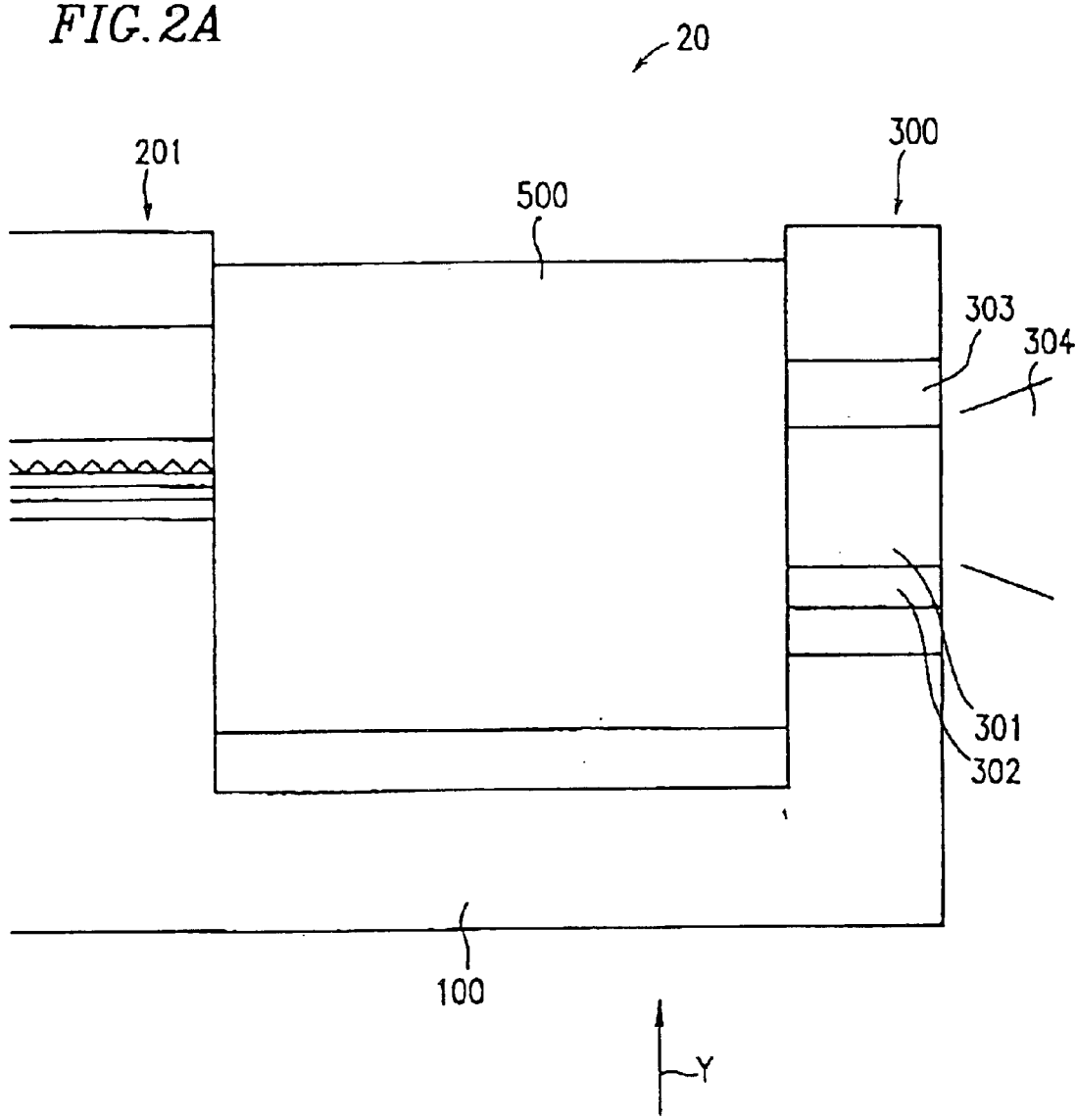

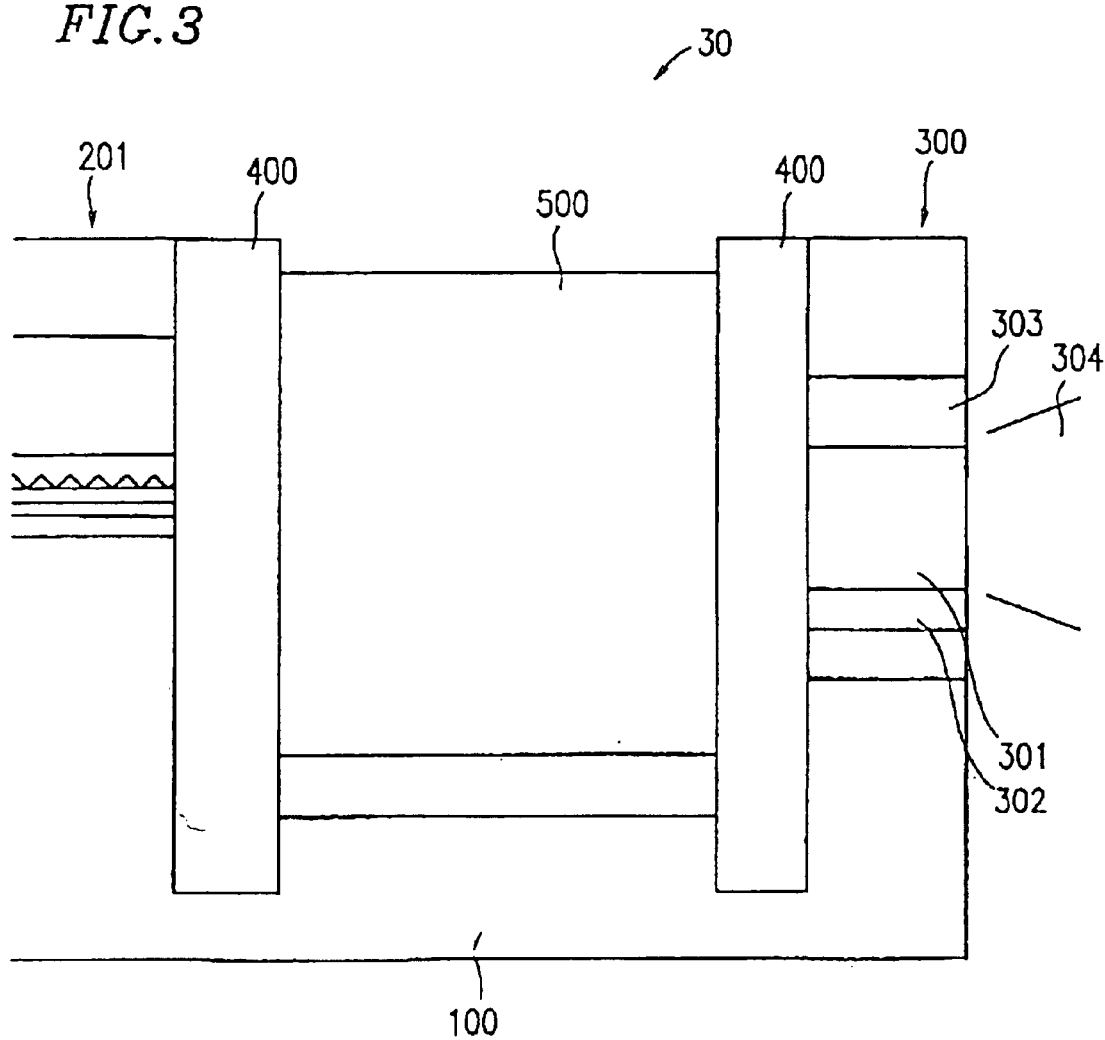

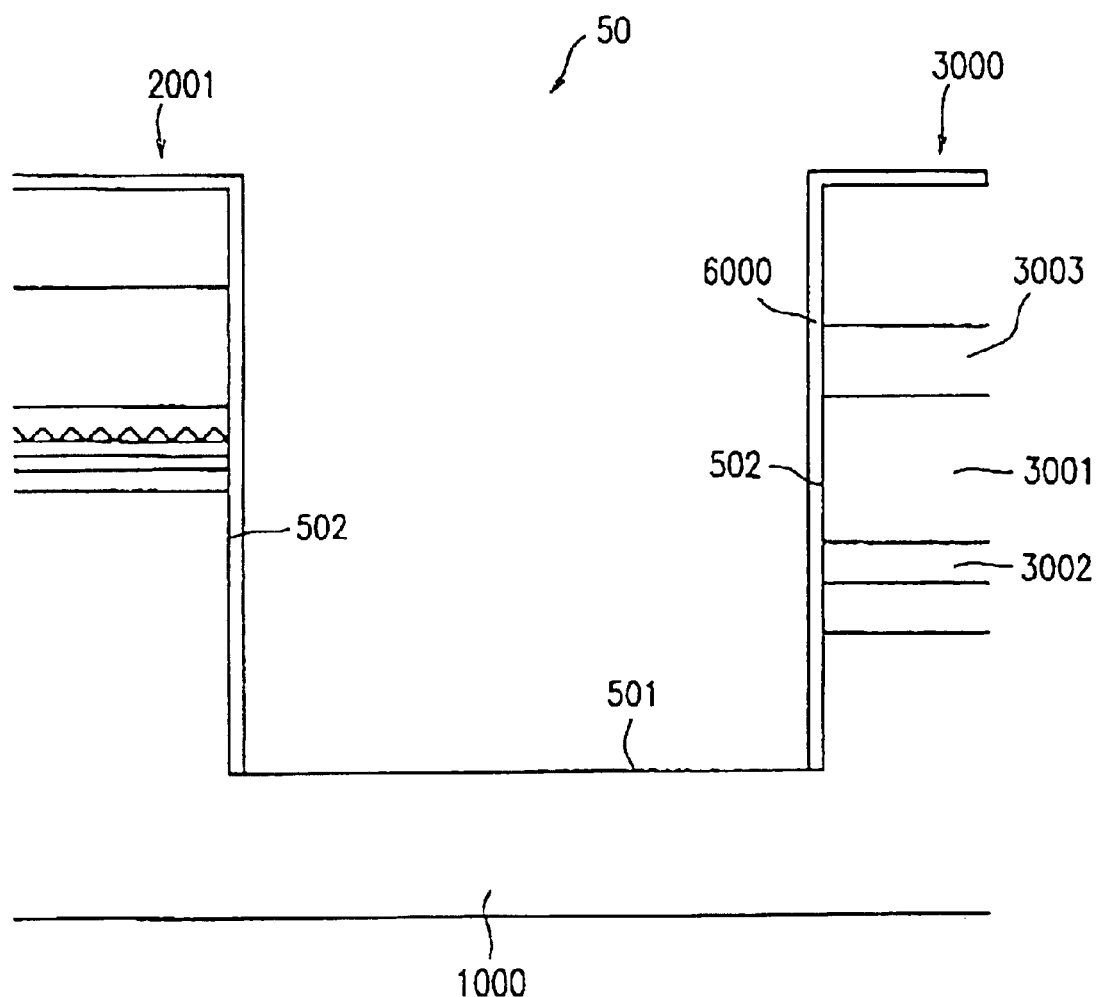

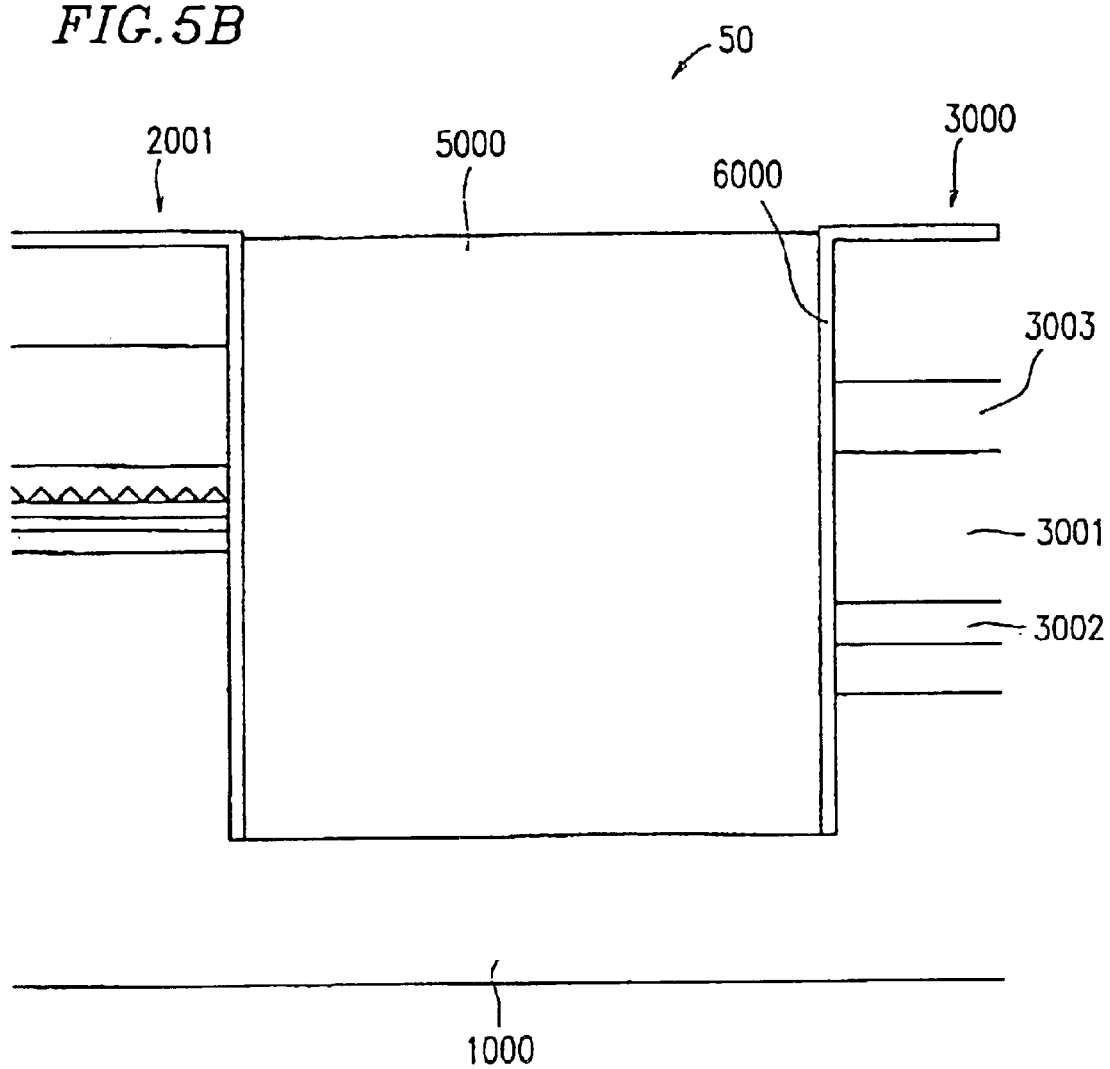

SEMICONDUCTOR LASER DEVICE WITHSPOT-SIZE CONVERTER AND METHOD FOR FABRICATING THE SAME

BACKGROUND OF THE INVENTION

1. Field of the Invention

The present invention relates to a semiconductor laser device with a spot-size converter which can couple light to an optical fiber or light waveguide with a high level of efficiency, and to a method of fabricating the semiconductor laser device.

2. Description of the Related Art

Multimedia technologies which have been rapidly developing are likely to enable high-speed, high capacity optical communications (the data transfer rate of which may be 100 Mbps or more) at home as well as at the office in the near future. Among the technologies, the Fiber-To-The-Home (FTTH) is a promising technology which extends an optical fiber from the trunk line to home. In this technology, the output light of a semiconductor laser is required to be introduced into an optical fiber. However, a typical semiconductor laser has its output light of a spot size (about 1 $\mu$m) that is largely different from a spot size of single-mode optical fiber (about 10 $\mu$m). For this reason, when the semiconductor laser is directly connected with the optical fiber, a great insertion loss is generated due to mode mismatch.

The small spot-size of the semiconductor laser gives rise to a problem that a very small displacement of the spot leads to a great increase in the insertion loss. For example, an about 1 $\mu$m displacement between the semiconductor laser and the optical fiber may generate as much as a 10 dB excess loss. To solve this problem, a semiconductor laser with a spot-size converter is considered in which a light waveguide having a larger spot-size than that of a semiconductor laser is integrated along with the semiconductor onto the same substrate.

One method for achieving such a device is a butt junction as shown in FIG. 7A. FIG. 7A shows a semiconductor laser device with a spot-size converter having an ideal structure thereof. In FIG. 7A, a refractive Index coupling-type distributed-feedback semiconductor laser (DFB laser) 200 formed on a semiconductor substrate 100 has a portion thereof removed vertically by etching. In the removed portion, a light waveguide 300 is formed in which a light waveguide layer 301 is sandwiched between light confinement layers 302 and 303. Light output from the semiconductor laser 200 is directly coupled with the light waveguide 300 and the light is then guided in the light waveguide layer 301.

The semiconductor laser device with a spot-size converter thus constructed has a larger spot-size of output light than that of a semiconductor laser, thereby relieving the effect of a very small displacement which occurs when coupling the light with an optical fiber.

However, the above-described conventional example has the following drawbacks.

(1) The ideal shape as shown in FIG. 7A is not actually obtained when the light waveguide is formed in the vertically etched region. The actual shape is, for example, as shown in FIG. 7B. In FIG. 7B, the light waveguide layer 301 is sloped in the vicinity of the place where the semiconductor laser 200 is coupled with the light waveguide 300. In this region, light is affected by the refractive index distribution of this structure so that the proportion of light which is not coupled with the light waveguide layer increases and the coupling rate is therefore greatly reduced from what is expected according to the ideal shape.

(2) When the beam diameter in the vertical direction of the semiconductor laser 200 is not equal to the beam diameter of the inherent mode in the vertical direction of the light waveguide 300, the proportion of light output from the semiconductor laser which is coupled with the light waveguide decreases. The greater the difference between the beam diameters, the more the decrease in the proportion of coupled light.

The above problems (1) and (2) will be described in greater detail below.

FIG. 7D illustrates a concrete example where an InGaAsP-based 1.3 $\mu$m-band distributed-feedback (DFB) semiconductor laser is vertically etched and then InGaAsP materials are grown by Metal Organic Chemical Vapor Deposition (MOCVD). The growth rate largely depends on the orientation of the growing plane. A plane having a low growth rate is exposed during the growth, resulting in a shape as shown in FIG. 7B. In this case, a layer structure tilted from a horizontal direction emerges. Therefore, part of the light is affected by the shape and thus reflected or refracted on the interface. The affected part of the light is not coupled with the light waveguide layer 301 and radiated outside the waveguide. In other words, a radiation loss is generated. According to results of experiments conducted by the inventors and the like, it was confirmed that about 1 dB light is radiated by this effect. When the growth was conducted under other conditions different from the above-described conditions, the shape was varied in various ways. Nevertheless, it was impossible to achieve the ideal shape as shown in FIG. 7A and radiation losses in the range of about 0.5 to 1 dB were observed.

Moreover, in this example, the beam diameter in the vertical direction of the semiconductor laser 200 was about 1 $\mu$m while the light waveguide layer 301 of the light waveguide 300 was fabricated in such a way as to have a thickness of about 2 $\mu$m. This difference resulted in great mode mismatch in coupling light, causing a radiation loss of 1.7 dB to be observed. The sum of both the losses was about 2.7 dB, which requires the semiconductor laser 200 to output light greater than what is actually needed. This increases power consumption by the semiconductor laser 200. In addition, the reliability is reduced. These are big problems. Considering the case where the semiconductor laser is coupled with an optical fiber having a typical mode diameter of about 10 $\mu$m, the thickness of the light waveguide layer is preferably greater. In this case, the above-described radiation lose is further increased.

SUMMARY OF THE INVENTION

A semiconductor laser device with a spot-size converter according to the present invention includes at least a semiconductor laser region emitting light from an end facet thereof and a light waveguide region. The semiconductor laser region and the light waveguide region are integrated on a semiconductor substrate in a horizontal direction. A semiconductor layer is buried in a junction region between the semiconductor laser region and the light waveguide region.

In one embodiment of the invention, the refractive index of the semiconductor layer is substantially uniform.

In one embodiment of the invention, the refractive index of the semiconductor layer varies in a layer direction continuously or in a stepwise manner.

In one embodiment of the invention, a region having the highest refractive index of the semiconductor layer is registered with a substantially central portion of a profile of light emitted from the semiconductor laser region as well as a substantially central portion of the inherent mode of the light waveguide region.

In one embodiment of the invention, a second semiconductor layer is provided between the semiconductor layer and at least one of the semiconductor laser region and the light waveguide region, the refractive index of the second semiconductor layer being substantially uniform.

In one embodiment of the invention, a dielectric layer is provided between the semiconductor layer and at least one of the semiconductor laser region and the light waveguide region.

According to another aspect of the invention, a semiconductor laser device with a spot-size converter includes at least a semiconductor laser region emitting light from an end facet thereof and a light waveguide region. The semiconductor laser region and the light waveguide region are integrated on a semiconductor substrate in a horizontal direction. A dielectric layer is buried in a junction region between the semiconductor laser region and the light waveguide region.

According to still another aspect of the invention, a semiconductor laser device with a spot-size converter includes at least a semiconductor laser region emitting light from an end facet thereof and a semiconductor layer. The semiconductor laser region and the semiconductor layer are integrated on a semiconductor substrate in a horizontal direction. The refractive index of the semiconductor layer varies in a layer direction continuously or in a stepwise manner.

In one embodiment of the invention, a region having the highest refractive index of the semiconductor layer is registered with a substantially central portion of a profile of light emitted from the semiconductor laser region.

In one embodiment of the invention, a second semiconductor layer is provided between the semiconductor layer and the semiconductor laser region, the refractive index of the second semiconductor layer being substantially uniform.

In one embodiment of the invention, a dielectric layer is provided between the semiconductor layer and the semiconductor laser region.

According to still another aspect of the invention, a method for fabricating the semiconductor laser device with a spot-size converter including at least a semiconductor laser region emitting light from an end facet thereof and a light waveguide region wherein the semiconductor laser region and the light waveguide region are integrated on a semiconductor substrate in a horizontal direction. The method includes the steps of forming a first semiconductor multilayer functioning as the semiconductor laser region on the substrate; removing part of the first semiconductor multilayer by etching to have a substantially vertical cross-section thereof; forming a second semiconductor multilayer functioning as the light waveguide region in the etched region; removing a region including an interface between a light emitting end facet of the semiconductor laser region and a light incident surface of the light waveguide region by etching to have a substantially vertical cross-section thereof; and forming a semiconductor layer in the etched region between the semiconductor laser region and the light waveguide region.

According to still another aspect of the invention, a method for fabricating the semiconductor laser device with a spot-size converter including at least a semiconductor laser region emitting light from an end facet thereof and a semiconductor layer wherein the semiconductor laser region and the semiconductor layer are integrated on a semiconductor substrate in a horizontal direction. The method includes the steps of forming a semiconductor multilayer functioning as the semiconductor laser region on the semiconductor substrate; removing part of the semiconductor multilayer by etching to have a substantially vertical cross-section thereof; and forming the semiconductor layer in the etched region.

In one embodiment of the inventions a dielectric layer is formed on a side of the etched region before formation of the semiconductor layer.

According to still another aspect of the invention, a method for fabricating the semiconductor laser device with a spot-size converter including at least a semiconductor laser region emitting light from an end facet thereof and a light waveguide region wherein the semiconductor laser region and the light waveguide region are integrated on a semiconductor substrate in a horizontal direction. The method includes the steps of forming a first semiconductor multilayer functioning as the semiconductor laser region on the substrate; removing part of the first semiconductor multilayer by etching to have a substantially vertical cross-section thereof; forming a dielectric layer on a side of the etched region; and forming a second semiconductor multilayer functioning as the light waveguide region in the etched region.

Thus, the invention described herein makes possible the advantages of (1) providing a semiconductor laser device with a spot-size converter having a low lose and high reliability by minimizing the above-described lose of light at the junction portion between a semiconductor laser and a light wave guide, and (2) providing a fabrication method thereof.

Hereinafter, functions of the present invention will be described.

By providing the structure in which the semiconductor layer having a substantially uniform refractive index is buried in the junction region between the semiconductor laser and the light waveguide, the semiconductor laser device with a spot-size converter can be obtained that does not have any layer structure tilted from a horizontal direction in the junction portion between the semiconductor laser and the light waveguide. This results in a reduction in the difference in an equivalent refractive index at the interface between the semiconductor laser portion and the buried region as well as at the interface between the buried region and the light waveguide portion. Therefore, waveguided light substantially is not reflected or refracted at these interfaces, thereby reducing the radiation loss.

By providing the structure in which the semiconductor layer having a refractive index varying substantially continuously or in a stepwise manner in the direction of the layer is buried in the junction region between the semiconductor laser and the light waveguide, the mode profile of light transmitted in the waveguide is continuously varied due to the lens effect of the semiconductor layer in such a way that the light is coupled with the waveguide when the beam diameter of the light becomes equal to the beam diameter of the inherent mode of the light waveguide. Therefore, the coupling loss caused by mode mismatch can be more effectively reduced.

By providing the structure in which the semiconductor laser and the semiconductor layer of which the refractive index varies substantially continuously or in a stepwise manner in the direction of the layer are integrated on the semiconductor substrate in a horizontal direction, the mode profile of light transmitted in the semiconductor layer is continuously varied due to the lens effect of the semiconductor layer. Therefore, the coupling loss caused by mode mismatch can be more effectively reduced while the number of growth processes is small.

By providing the structure in which the dielectric layer is disposed in the junction region between the semiconductor laser and the light waveguide, the semiconductor laser device with a spot-size converter can be obtained which does not have any layer structure tilted from the horizontal direction in the junction region between the semiconductor laser and the light waveguide. Therefore, the coupling loss can be reduced as in the above-described cases.

By providing the structure in which the dielectric layer is disposed in the junction region between the semiconductor laser and the semiconductor layer and in which the semiconductor layer having a refractive index varying substantially continuously or stepwisely in a direction of the layer is formed in the junction region the semiconductor laser and the light waveguide, the semiconductor laser device with a spot-size converter can be obtained that does not have any layer structure tilted from a horizontal direction in the junction region between the semiconductor laser and the light waveguide and therefore does not have mods mismatch. Therefore, the coupling lose can be largely reduced.

These and other advantages of the present invention will become apparent to those skilled in the art upon reading and understanding the following detailed description with reference to the accompanying figures.

BRIEF DESCRIPTION OF THE DRAWINGS

FIG. 2A is a cross-sectional view illustrating a semiconductor laser device with a spot-size converter according to Example 2 of the present invention.

FIG. 3 is a cross-sectional view illustrating a semiconductor laser device with a spot-size converter according to Example 3 of the present invention.

FIGS. 5A and 5B are cross-sectional views illustrating a semiconductor laser device with a spot-size converter according to Example 5 of the present invention.

DESCRIPTION OF THE PREFERRED EMBODIMENTS

Examples of the present invention will be described with reference to the accompanying drawings in great detail.

EXAMPLE 1

Figure 1A:
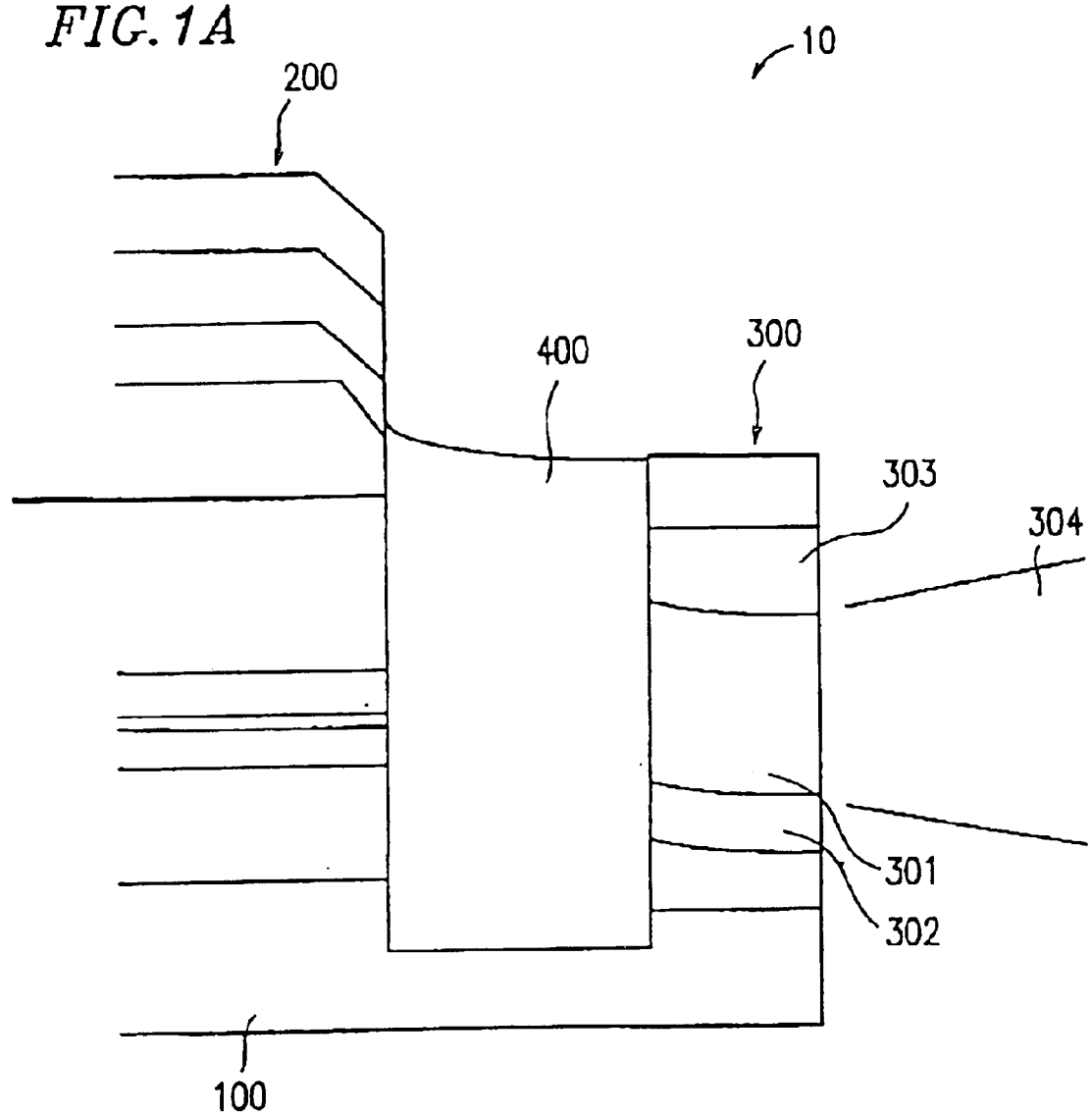
FIG. 1A is a cross-sectional view illustrating a semiconductor laser device with a spot-size converter according to Example 1 of the present invention.
Figure 1B:
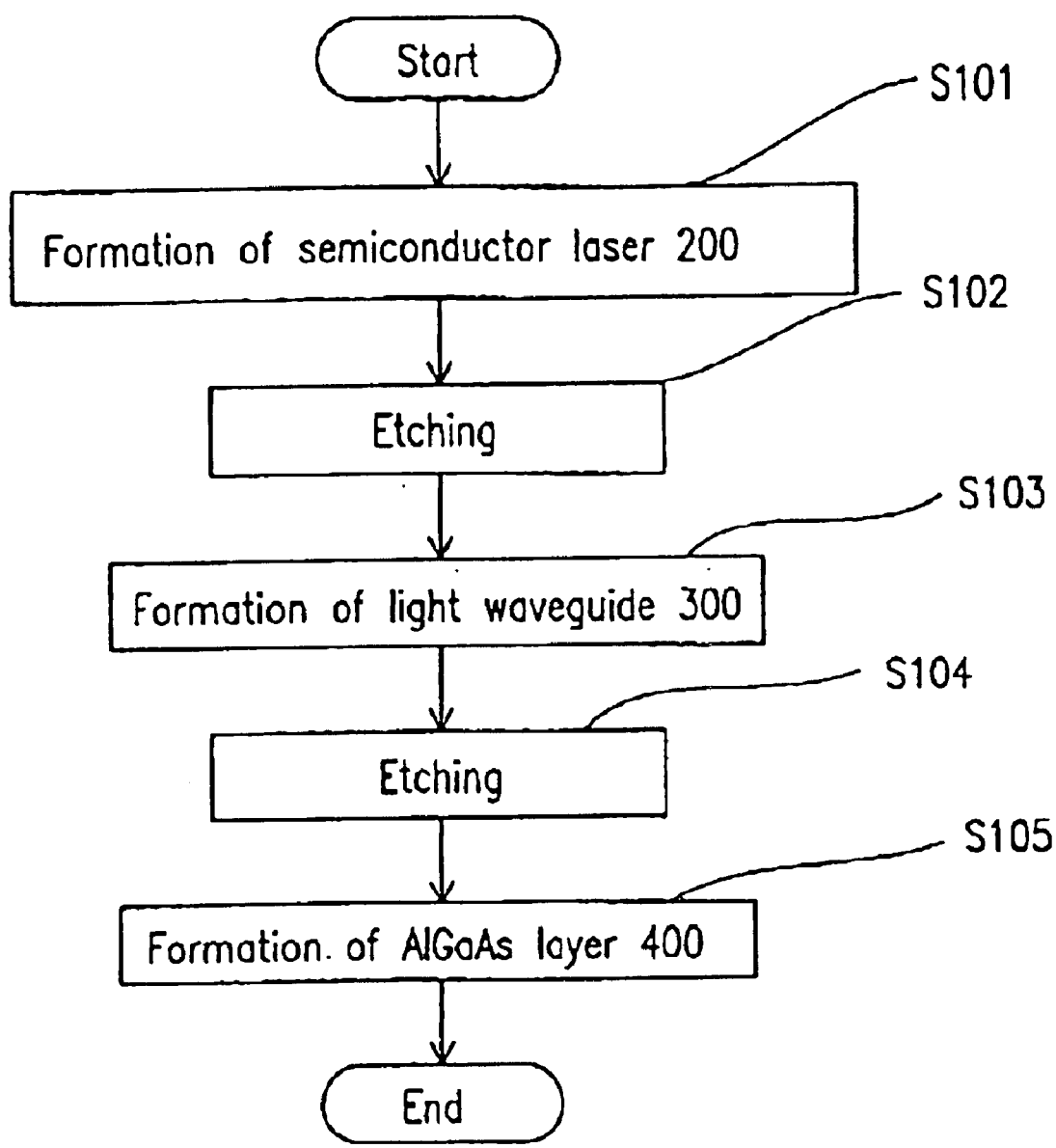
FIG. 1B is a flowchart of a method for fabricating the semiconductor laser device with a spot-size converter of Example 1.

FIG. 1A shows a semiconductor laser device with a spot-size converter 10 according to Example 1 of the present invention. FIG. 1D shows a flowchart of a method for fabricating the semiconductor laser device 10 of Example 1. In Example 1, the semiconductor laser device 10 includes a semiconductor laser with a quantum well structure. The structure of the semiconductor laser device 10 will be described along with a fabrication process thereof below. Firstly, a GaAs substrate (wafer) 100 was placed in a Molecular Beam Epitaxy (MBE) apparatus. Semiconductor layers were grown on the GaAs substrate 100 by MBE to produce a semiconductor laser 200 (S101). Specifically, the semiconductor laser 200 included an active layer composed of a GaInNAs quantum well layer and a GaAs guide layer, and a cladding layer of AlGaAs material. The beam diameter in the vertical direction of the semiconductor laser 200 was about 1 $\mu$m. GaInNAs alloy semiconductor is a material which can achieve light emission having a wavelength of 1.3 $\mu$m on a GaAs substrate, and is therefore a promising candidate for a light source for the FTTH.

The wafer on which the semiconductor layers had been formed was removed from the MBE apparatus. The wafer was then subjected to Reactive Ion Beam Etching (RIBE) using chloride gas 60 that the semiconductor layer was etched as deep as the etching reached the GaAs substrate 100 (S102). Thereafter, the wafer was placed in an MOCVD apparatus. A light waveguide 300 was grown on the wafer by MOCVD (S103). The light waveguide 300 had a structure in which a light waveguide layer 301 was sandwiched between upper and lower light confinement layers 303 and 302 where the light waveguide layer 301 had an Al molar fraction of 0.2 and a thickness of 2 $\mu$m.

The upper and lower light confinement layers 303 and 302 had the same Al molar fraction and thickness that are 0.22 and 1 $\mu$m, respectively. In this case, the cross-sectional shape of the semiconductor laser device 10 had a structure tilted from a horizontal direction as does the conventional semiconductor laser device. As is far away from the junction portion between the semiconductor laser 200 and the light waveguide 300, the angle of the tilt decreases. The light waveguide 300 was substantially horizontal at a distance of 3 $\mu$m or more from the junction portion. The light waveguide 300 was transparent for the output light (1.3 $\mu$m) of the semiconductor laser 200, functioning as a low-loss waveguide. The depth controllability of the etching was about 2%. The subsequent MOCVD growth had the 1% controllability of the thickness of the grown layer. Even when both the controllabilties were taken into account, the center of the output light distribution of the semiconductor laser 200 could be registered with the center of the inherent mode of the horizontal portion of the light waveguide 300 with 0.1 $\mu$m accuracy.

The junction region between the semiconductor laser 200 and the light waveguide 300 was vertically etched over a width of 2 $\mu$m (S104). In this case, accurate control was not required for the depth of the etching since the etching only needed to penetrate through the light waveguide 300. The above-described RIBE was applied to this etching.

Subsequently, an AlGaAs layer 400 having an Al molar fraction of 0.2 was grown and buried in the etched region using the above-described MOCVD (S105). The semiconductor layers which had been grown to be formed on the semiconductor laser 200 (i.e., above a thick line in FIG. 1A showing the state before removal) was removed. The laser device 10 was processed into a ridge shape, and provided with n structure for confining light in a transverse direction. An electrode was formed on the semiconductor laser 200. Finally, the wafer was subjected to cleavage and the like. Thus, the semiconductor laser device with a spot-size converter 10 of Example 1 was obtained.

In the semiconductor laser device with a spot-size converter 10 of Example 1, laser light generated in the semiconductor laser 200 penetrates throughout the AlGaAs layer 400, reaches the light waveguide 300, transmits through the light waveguide 300 and is finally emitted from an end facet portion thereof as emitted light 304. The laser device 10 substantially does not have any layer structure tilted from a horizontal direction, whereby the great loss caused by the radiation loss as seen in the conventional example was not observed.

In the laser device 10, light generated in the semiconductor laser 200 substantially is not reflected at the interface between the semiconductor laser 200 and the AlGaAs layer 400 as well as at the interface between the AlGaAs layer 400 and the light waveguide 300. This is due to the small difference in the equivalent refractive index at the interfaces. Therefore, the laser device 10 operated satisfactorily in an external cavity mode in which the semiconductor laser 200, the AlGaAs layer 400 and the light waveguide 300 as a whole work as an optical cavity.

The laser device 10 does not have a structure for confining light in the vertical direction in the AlGaAs layer 400 which was finally buried. Nevertheless, the 2 $\mu$m width of the junction region of Example 1 is so small that the amount of radiated light is negligible. The coupling loss in the laser device 10 was caused by mods mismatch alone, the value of which was 1.7 dB according to actual evaluation of the optical characteristics of the laser device 10. Thus, the coupling loss could be largely reduced as compared with the conventional laser device.

The radiation loss was investigated by varying the length of the buried region, i.e., the AlGaAs layer 400. As a result, no significant loss was observed up to about 15 $\mu$m, whereas the loss was gradually increased with the length beyond about 15 $\mu$m. When the length of the buried region was set to 20 $\mu$m, the radiation loss is about 1 dB. Thus, the length of about 20 $\mu$m or less could reduce the loss to about 1 dB or lees and desired characteristics were obtained, although the tolerant range of the length was dependent on the required amount of the lose.

EXAMPLE 2

Figure 2B:
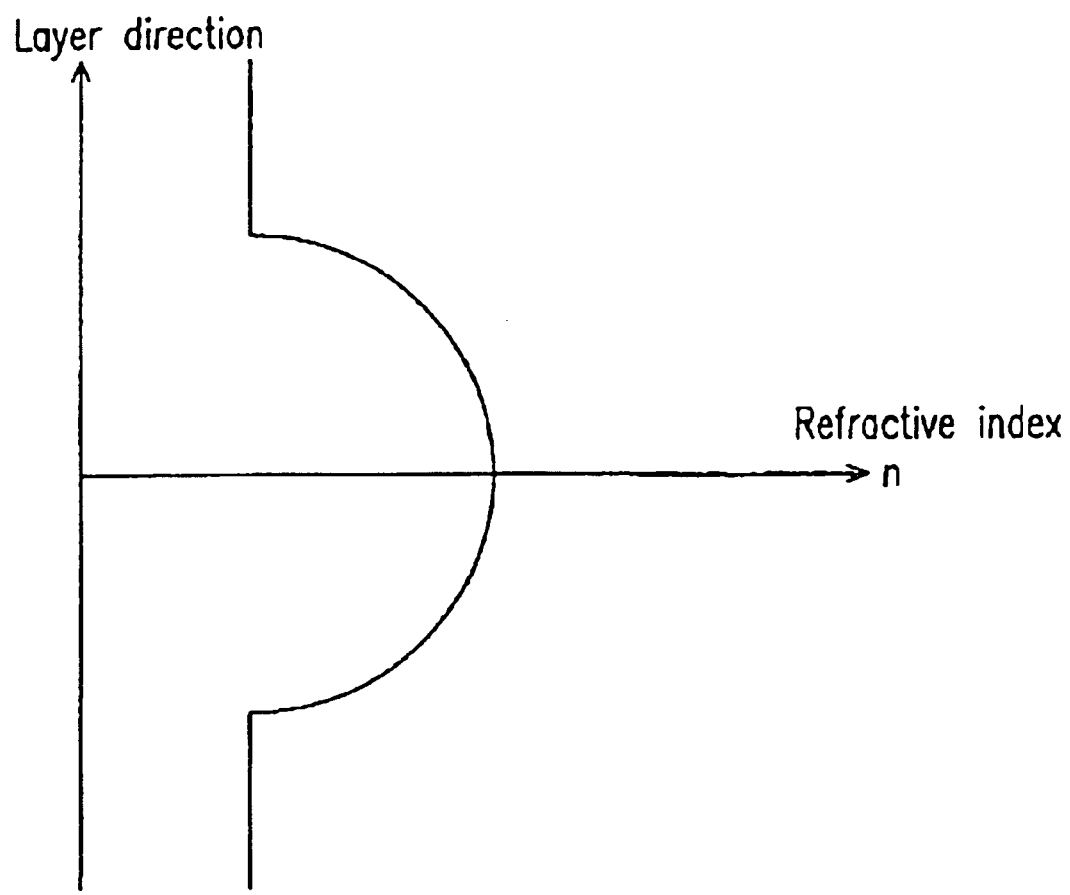
FIG. 2B is a conceptual diagram illustrating a refractive index profile of a GRIN region.

FIGS. 2A and 2B show a semiconductor laser device with a spot-size converter 20 according to Example 2 of the present invention. In Example 2, the present invention is applied to an integrated semiconductor laser device including a gain coupling type distributed-feedback semiconductor laser having an absorptive diffraction grating. Hereinafter, the structure of the laser device 20 will be described along with a fabrication process thereof.

Firstly, semiconductor layers were grown on a GaAs substrate 100 by MOCVD to produce a DFB laser 201. Specifically, the DFB laser 201 included an active layer composed of a GaInNAs quantum well layer and a GaAs guide layer, and layers made of AlGaAs materials other than the GaInNAs quantum well layer.

This laser is described in detail in, e.g., Y. Nakano, et al., Japanese Journal of Applied Physics, Vol. 32, No. 2, pp. 825–829 (1993). The beam diameter in the vertical direction of the DFB laser 201 was about 1 $\mu$m. A three-layer quantum well structure was adopted for the active layer; and the oscillation wavelength was set to 1.3 $\mu$m.

The semiconductor layers were vertically etched by Chemically Assisted Ion Beam Etching (CAIBE) in which the wafer was irradiated by chloride ions or argon ions as well as chloride gas itself. The depth of the etching was sufficiently deep that the etching reached the substrate 100. This etching is described in detail in H. Kawanishi, et al., Japanese Journal of Applied Physics, Vol. 35, No. 7B, pp. 880–882 (1996).

Subsequently, a light waveguide 300 composed of a plurality of semiconductor layers was grown by the above-described MOCVD. The light waveguide 300 was the same as that of Example 1. However, in this case, the plurality of semiconductor layers were prevented from growing on the semiconductor laser 201 by selective growth using a silicon oxide film as a mask.

In FIG. 2A, reference numerals 303 and 302 designate upper and lower light confinement layers, respectively, as in Example 1.

After the growth, the plurality of semiconductor layers were buried in the wafer so that the top surface of the wafer becomes flat. However, observation of the cross-sectional shape revealed a layer structure tilted from a horizontal direction as in the conventional device. The thickness of the light waveguide layer 301 was 2 $\mu$m. In Example 2 as well as Example 1, the center of the output light distribution of the DFB laser 201 could be registered with the center of the inherent mode of the horizontal portion of the light waveguide 300 with 0.1 $\mu$m accuracy. The wafer was vertically etched over the range of 7.8 $\mu$m width including the junction region between the DFB laser 201 and the light waveguide 300. The etching penetrated throughout the light waveguide 300, the depth of which was 7.0 $\mu$m.

Subsequently, a semiconductor layer 500 having a structure in which a refractive index n which varies continuously was grown in the etched region. FIG. 2B shows a profile of the refractive index n of the semiconductor layer 500 with respect to a layer direction (thickness direction) Y thereof. As shown in FIG. 2B, the distribution of the refractive index n in the layer direction Y increases from the peripheral portion to the central portion like a second-order function. This variation in the distributions of the refractive index n is a controlled by the Al molar fraction.

Here, the semiconductor layer 500 (hereinafter referred to as a GRaded INdex (GRIN) region) had a thickness of 2.894 $\mu$m for a half portion thereof (the central portion to the peripheral portion), a refractive index of 3.4 (the maximum of the refractive index) for the central portion thereof, and a refractive index of 3.2 (the minimum of the refractive index) for the peripheral portion thereof. The position of the central portion which had the maximum refractive index was registered with the center of the output light distribution of the DFB laser 201 and the center of the inherent mode of the light waveguide 300. This registration control was easily realized by computer-controlling the flow rate of the mass flow controller of the MOCVD apparatus.

Subsequently, the DFB laser 201, the GRIN region 500 and the light waveguide 300 were etched to form a groove having a width of 2 $\mu$m which defines a waveguide region. This groove was sufficiently deep to penetrate through all the layers. Finally, a semiconductor layer (not shown) was buried in the etched region to form a buried transverse mode confinement structure. The semiconductor laser device with a spot-size converter 20 of Example 2 was completed.

The laser device 20 could perform laser oscillation without reflection at the interface between the DFB laser 201 and the GRIN region 500. The DFB laser 201 oscillated independently and satisfactorily. Light output from the DFB laser 201 transmits through the GRIN layer 500 and the light waveguide 300, and is output from an end facet as emitted light 304.

The coupling loss from the DFB laser 201 to the light waveguide 300 was evaluated for the laser device 20. As a result, the coupling loss was found to be about 0.4 dB. Of the 0.4 dB coupling loss, an estimated 0.2 dB was caused by non-horizontal growth during the growth of the GRIN region 500. Thus, it was confirmed that a loss caused by mode mismatch could be greatly reduced by use of the GRIN region 500. This is because the mode profile of light transmitting in the GRIN region 500 was continuously varied due to the ions effect of the GRIN region 500 in such a way that the light was coupled with the waveguide when the beam diameter of the light becomes equal to the beam diameter of the inherent mode of the light waveguide 300. The actual measurement of the coupling lose by varying the length of the GRIN region 500 confirmed that the coupling loss was periodically varied.

Therefore, the length of the GRIN region 500 is preferably optimized in accordance with the beam diameter of the inherent mode of the light waveguide 300. In Example 2, the refractive index of the GRIN region 500 was continuously varied like a second-order function. The second-order function may be approximated by stepwise line segments or the like. Other distributions of the refractive index may be also used as far as the distributions have substantially the same lens effect as that of the second-order function.

EXAMPLE 3

FIG. 3 shows a semiconductor laser device with a spot-size converter 30 according to Example 3 of the present invention. The laser device 30 was fabricated by combination of techniques used in Examples 1 and 2.

To reduce the coupling loss caused by the unhorizontal growth during the growth of the GRIN region 500, a region including the junction region between the DFB laser 201 and the GRIN region 500 or a region including the junction region between the GRIN region 500 and the light waveguide 300, or both the regions, was etched, and a semiconductor layer 400 was grown in the etched region. Thus, Example 3 obtains the effect of Example 1 in addition to the effect of Example 2.

The above-described etching only needs to proceed substantially vertically. Common etching methods can be used, such as Reactive Ion Etching (RIE) and wet etching.

A method for the crystal growth is not limited to the above-described MOCVD and MBE. In some cases, vapor phase epitaxy, chloride VPE or the like can be used. The same components as those in Examples 1 and 2 are indicated by the same identical reference numerals as those used therein.

EXAMPLE 4

Figure 4A:
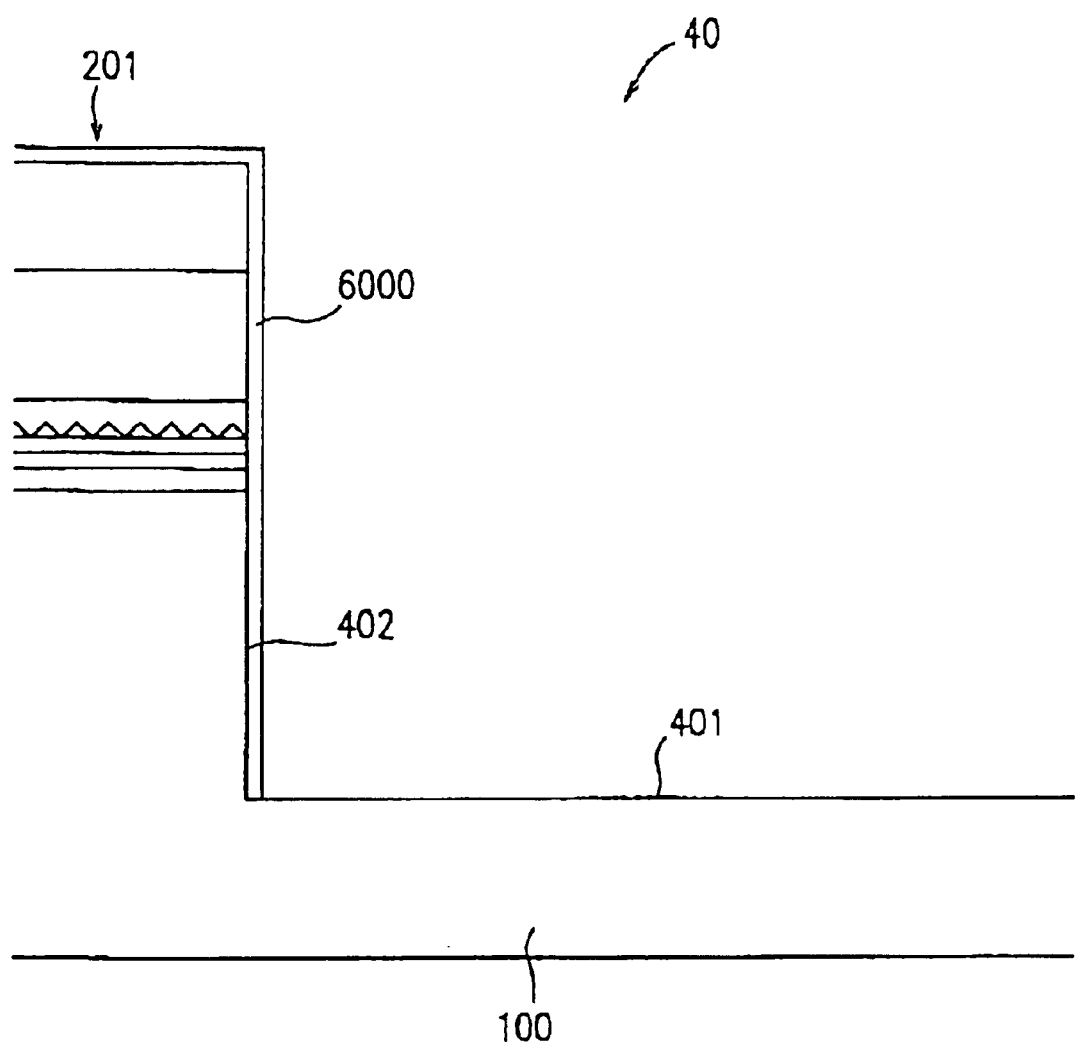
FIGS. 4A and 4D are cross-sectional views illustrating a semiconductor laser device with a spot-size converter according to Example 4 of the present invention.
Figure 4B:
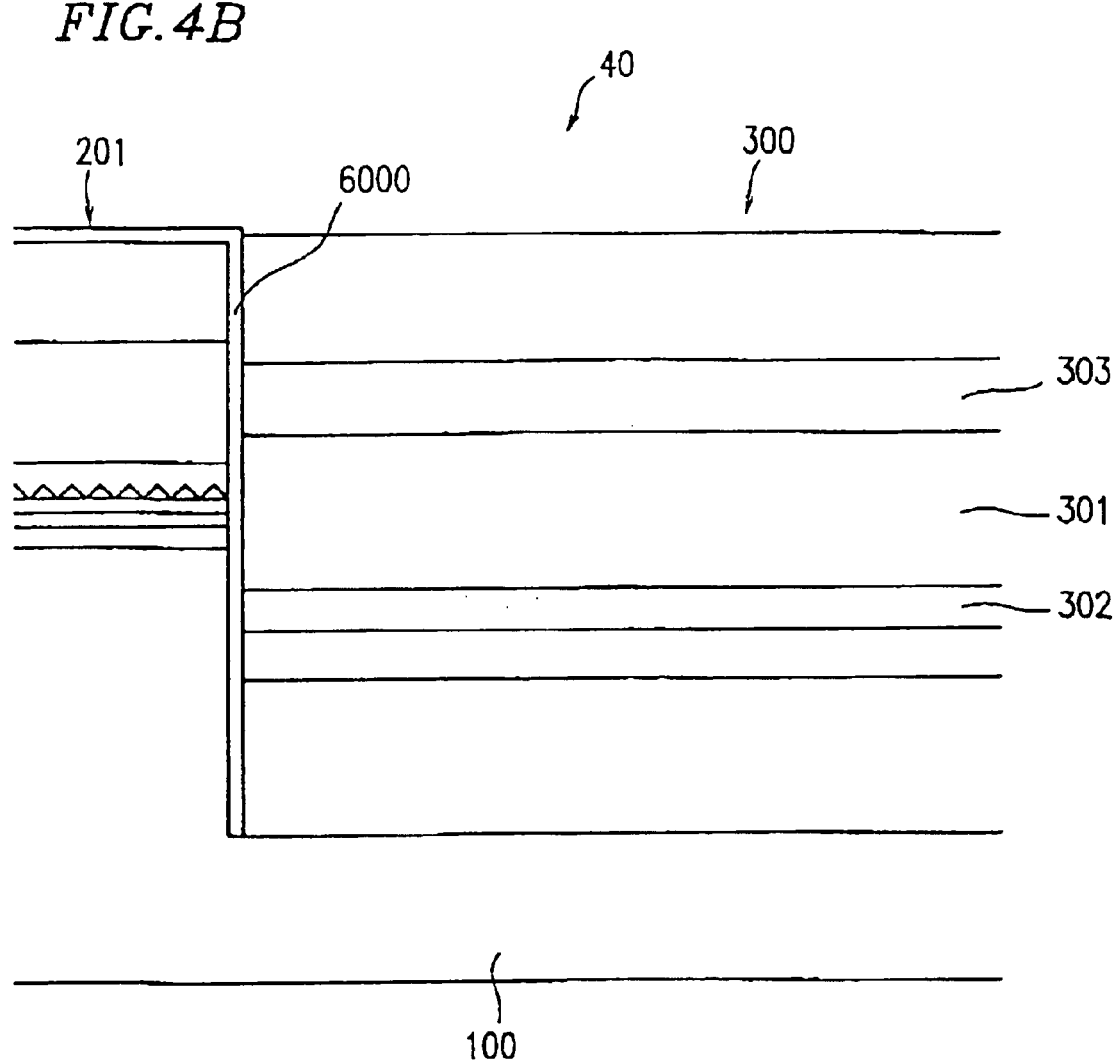
FIG. 4C is a flowchart of a method for fabricating the semiconductor laser device with a spot-size converter of Example 4.
Figure 4C:
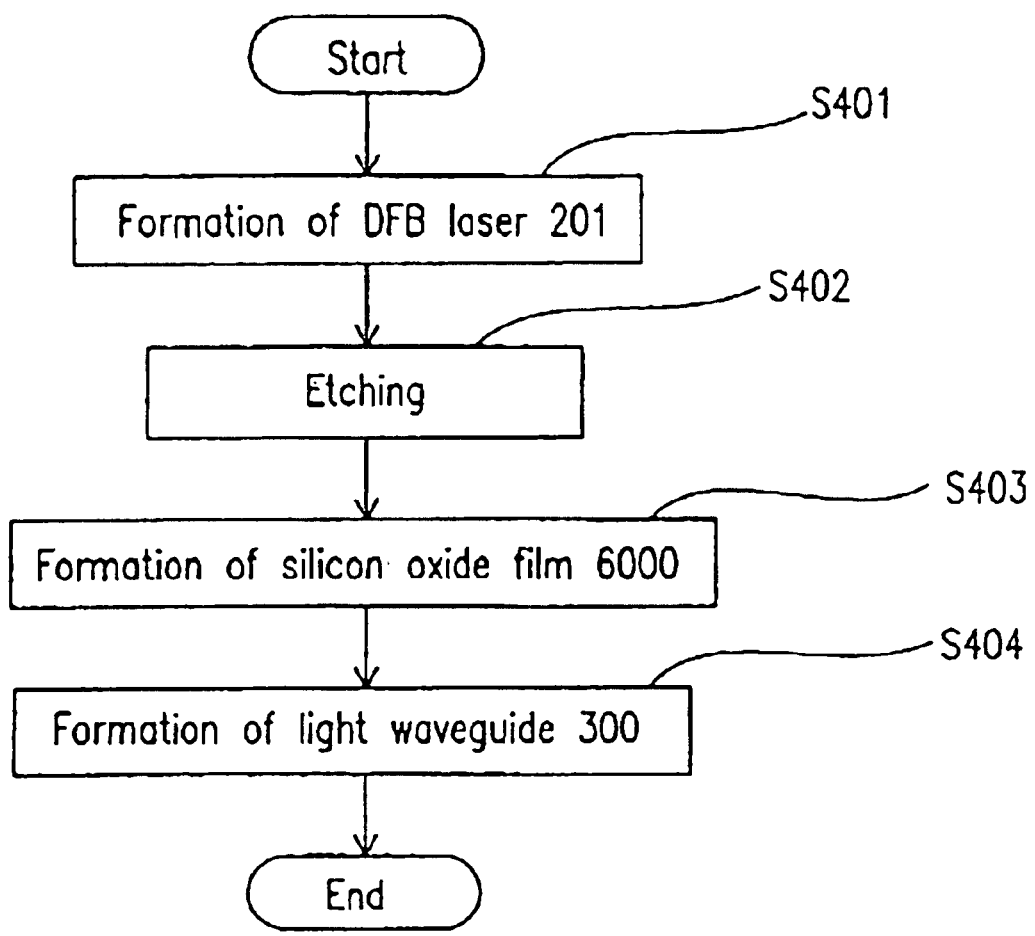

FIGS. 4A and 9B show a semiconductor laser device with a spot-size converter 40 according to Example 4 of the present invention. FIG. 4C is a flowchart of a fabrication method of the laser device 40. The laser device 40 is characterized by a fabrication process thereof. Hereinafter, a structure of the laser device 40 will be described along with a fabrication process thereof. In Example 4, the present invention is applied to a semiconductor laser device with a spot-size converter including a gain coupling-type distributed-feedback semiconductor laser having an absorptive diffraction grating.

Firstly, semiconductor layers were grown on a GaAs substrate 100 by MOCVD to produce a DFB laser 201 (S401). Specifically, the DFB laser 201 included an active layer composed of a GaInNAs quantum well layer and a GaAs guide layer, and layers made of AlGaAs materials other than the GaInNAs quantum well layer. The beam diameter in the vertical direction of the semiconductor laser 201 was also about 1 µm in Example 4. A two-layer quantum well structure was adopted for the active layer, and the oscillation wavelength was set to 1.3 µm.

Thereafter, the semiconductor layers were vertically etched by RIBE sufficiently deep that the etching reached the substrate 100 (S402). In the etching, a silicon oxide film was used as a mask. A silicon oxide film 6000 was then formed on the side of the etched region as shown in FIG. 4A (S403).

The formation was carried out by bias spattering in which spattering was performed over the GaAs substrate 100 in the presence of applied bias voltage. In this case, substantially no silicon oxide was formed on a base 401 of the etched region. The silicon oxide film 6000 was formed on the side 402 of the etched region and was not formed on the base 401 of the etched region.

Here the thickness of the silicon oxide film 6000 was 20 nm. Such a thin film 6000 did not cause light to be reflected.

Subsequently, a light waveguide 300 composed of a plurality of semiconductor layers was grown by the above-described MOCVD. The plurality of semiconductor layers were prevented from growing On the DFB laser 201 by selective growth using a silicon oxide film as a mask. In the laser device 40, since the silicon oxide film 6000, which is a dielectric layer, was formed on the side 402 of the etched region, the growth in a direction perpendicular to the side 402 was suppressed, whereby substantially no growth toward a direction tilted from a horizontal direction occurs during the growth of the light waveguide 300. The semiconductor layers were grown while keeping the entire growth surface thereof parallel to the substrate 100.

Here, the thickness of a light waveguide layer 301 was set to 2 µm. In the laser device 40 of Example 4, the center of the output light distribution of the DFB laser 201 can be registered with the center of the inherent mode of the horizontally formed light waveguide 300 with 0.1 µm accuracy.

For the laser device 40, the coupling lose of light from the DFB laser 201 to the light waveguide 300 was evaluated. As a result, the coupling loss was found to be about 1.8 dB. This confirmed that only a loss caused by mode mismatch contributed to the coupling lose. FIG. 4B a diagram illustrating the laser device 40 halfway through a fabrication process thereof. The diagram does not show an actual end facet for outputting light.

EXAMPLE 5

FIGS. 5A and 5B show a semiconductor laser device with a spot-size converter 50 according to Example 5 of the present invention. The laser device so was fabricated by combination of techniques used in Examples 2 and 4. Hereinafter, the structure of the laser device 50 will be described along with a fabrication method thereof.

Firstly, semiconductor layers were grown on an InP substrate 1000 by MBE to produce an InGaAsP DFB laser 2001. For the laser device 50, a gain coupling-type semiconductor laser having an absorptive diffraction grating was used as the DFB laser 2001. The beam diameter in the vertical direction of the DFB laser 2001 was about 1 $\mu$m. A five-layer quantum well structure was adopted for the active layer, and the oscillation wavelength was set to 1.55 $\mu$m.

Subsequently, the semiconductor layers were etched by RIBE sufficiently deep that the etching reached the InP substrate 1000. A light waveguide 3000 composed of a plurality of semiconductor layers was then grown by MOCVD. In this case, the plurality of semiconductor layers were prevented from growing on the DFB laser 2001 by selective growth using a silicon oxide film as a mask.

In FIGS. 5A and 5B, element 3001 is a light waveguide layer which is sandwiched between confinement layers 3002 and 3003.

Eventually, the plurality of semiconductor layers were buried in the wafer so that the top surface of the wafer became flat. However, observation of the cross-sectional shape revealed that there was a layer structure tilted from a horizontal direction as in the conventional device. The thickness of a light waveguide layer 3001 was 1.5 $\mu$m.

In the laser device 50 of Example 5, the center of the output light distribution of the DFB laser 2001 could be registered with the center of the inherent mode of the horizontal portion of the light waveguide 3000 with 0.1 $\mu$m accuracy. The wafer was vertically etched over the range of 4.17 $\mu$m width including the junction region between the DFB laser 2001 and the light waveguide 3000. The etching penetrated through the light waveguide 3000, the depth of which was 6.0 $\mu$m.

A silicon oxide film 6000 was formed on the sides of the etched region. The formation was carried out by bias spattering as in Example 4. In this case, substantially no silicon oxide war formed on a base 501 of the etched region. The silicon oxide film 6000 was formed only on the sides 502 of the etched region. Here a thickness of the silicon oxide film 6000 was 20 nm. As shown in FIG. 5B, a GRIN region 5000 having a structure in which a refractive index varies continuously was grown in the etched region. The refractive index was varied by adjusting molar fractions of In and As.

The central position of the GRIN region 5000 was registered with the center of the output light distribution of the DFB laser 2001 and the center of the inherent mode of the light waveguide 3000. This registration control was easily realized by computer-controlling the flow rate of the mass flow controller of the MOCVD apparatus, as was in Example 4.

In the laser device 50, since the dielectric layer (the silicon oxide film 6000) was formed on the sides 502 of the etched region, the growth in a direction perpendicular to the sides 502 was suppressed, whereby substantially no growth in a direction tilted from the horizontal direction occurred during the growth of the GRIN region 5000. The semiconductor layers were grown while keeping the entire growth surface thereof parallel to the InP substrate 1000.

A coupling loss of light from the DFB laser 2001 to the light waveguide 3000 was evaluated for the laser device 50. As a result, the coupling loss was about 0.2 dB, which confirmed a large loss reduction. This was because there was substantially no semiconductor layer tilted from the horizontal direction and substantially no mode mismatch. In Example 5, the dielectric layer was formed on both the sides of the DFB laser 2001 and the light waveguide 3000, although the dielectric film was not required to be formed on both the sides. The dielectric film on either of the sides has a corresponding effect. The dielectric film on both the sides has double the effect.

EXAMPLE 6

Figure 6A:
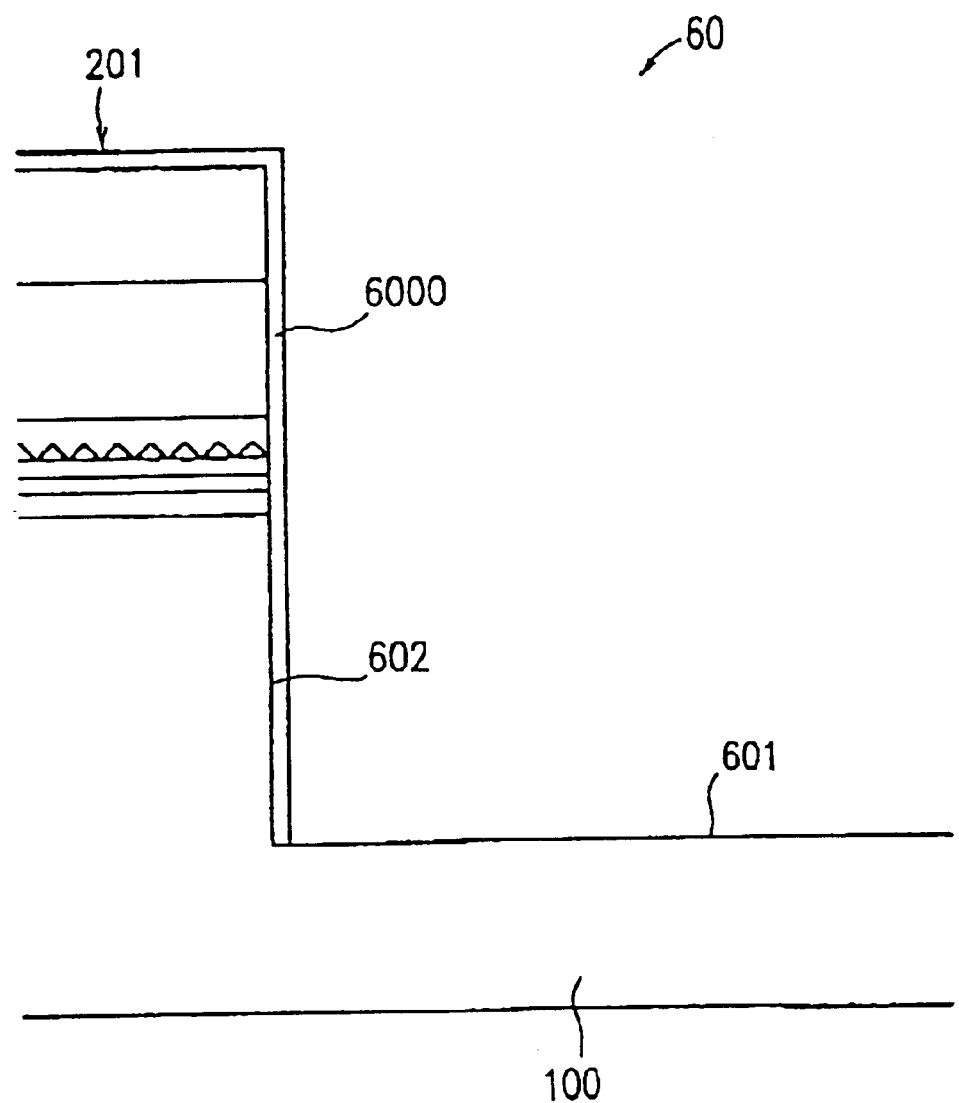
FIGS. 6A and 6B are cross-sectional views illustrating a semiconductor laser device with a spot-size converter according to Example 6 of the present invention.
Figure 6B:
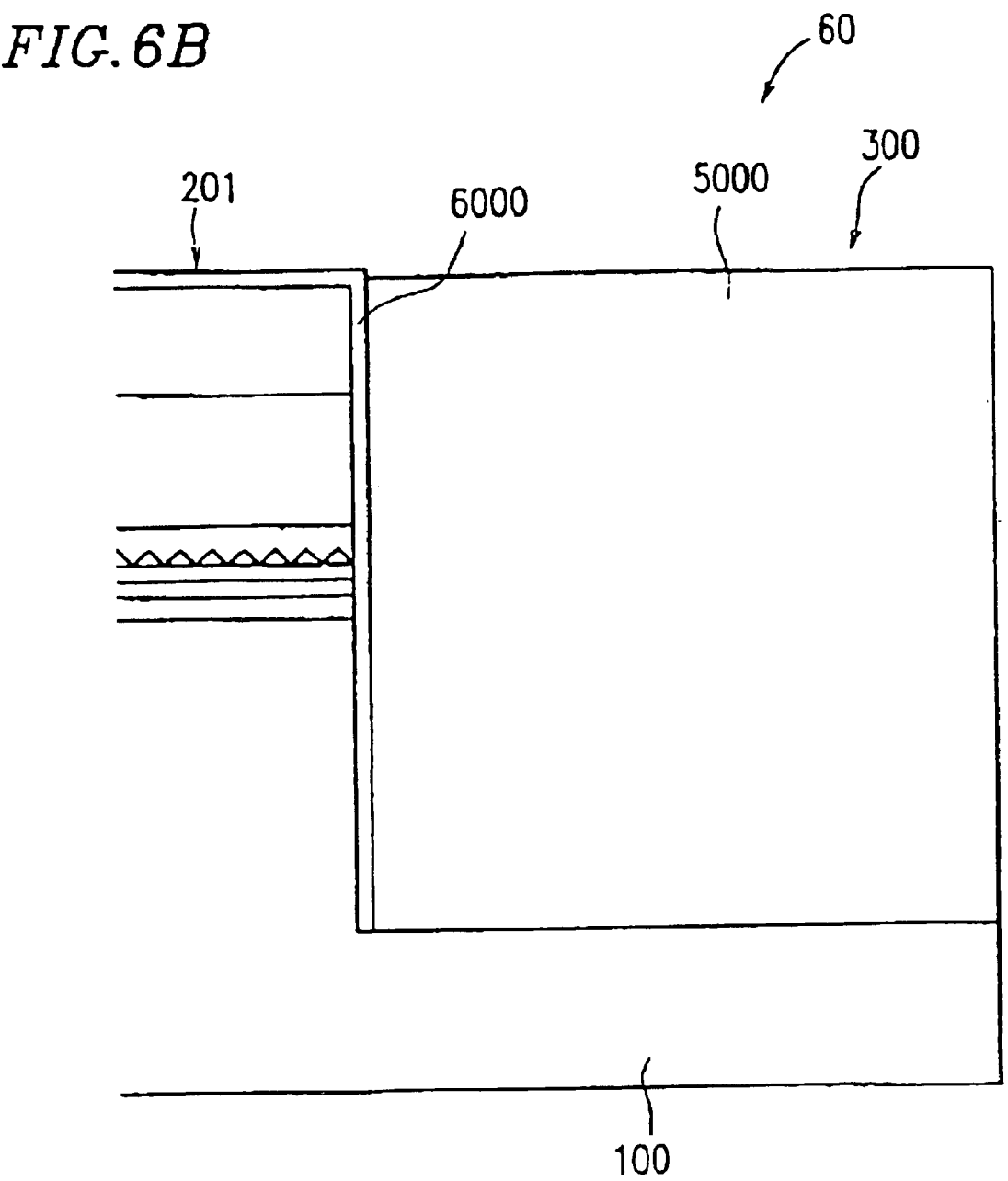
Figure 6C:
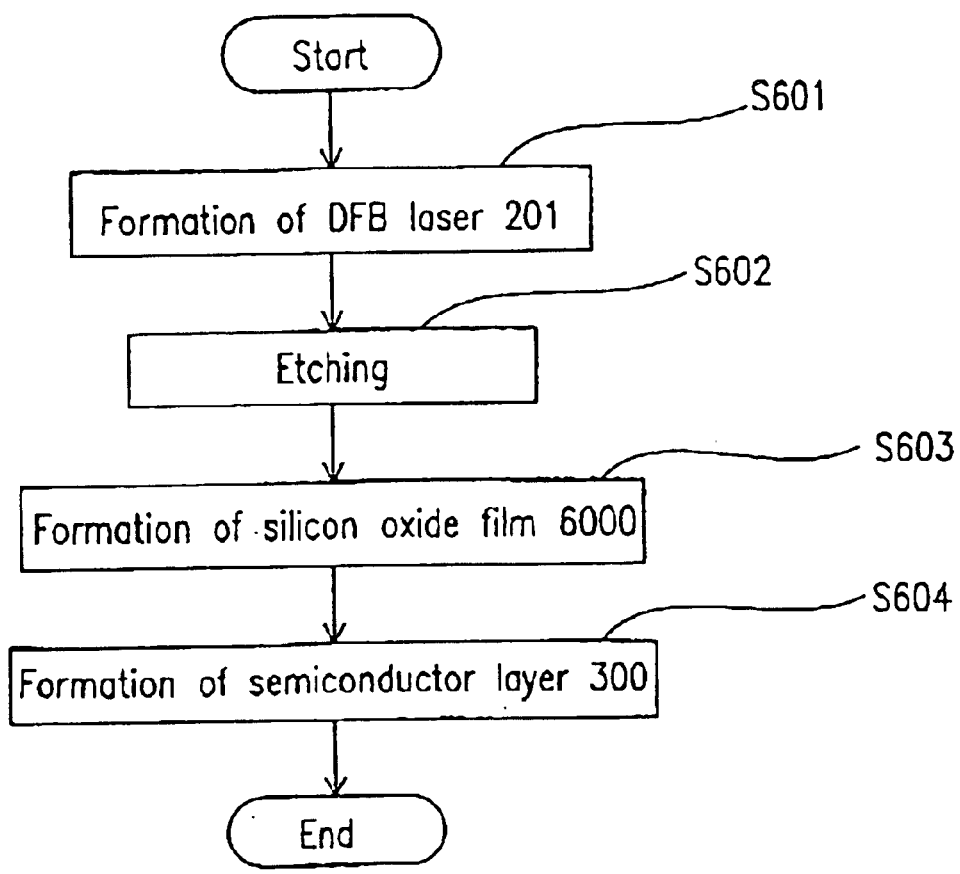
FIG. 6C is a flowchart of a method for fabricating the semiconductor laser device with a spot-size converter of Example 6.
Figure 7A:
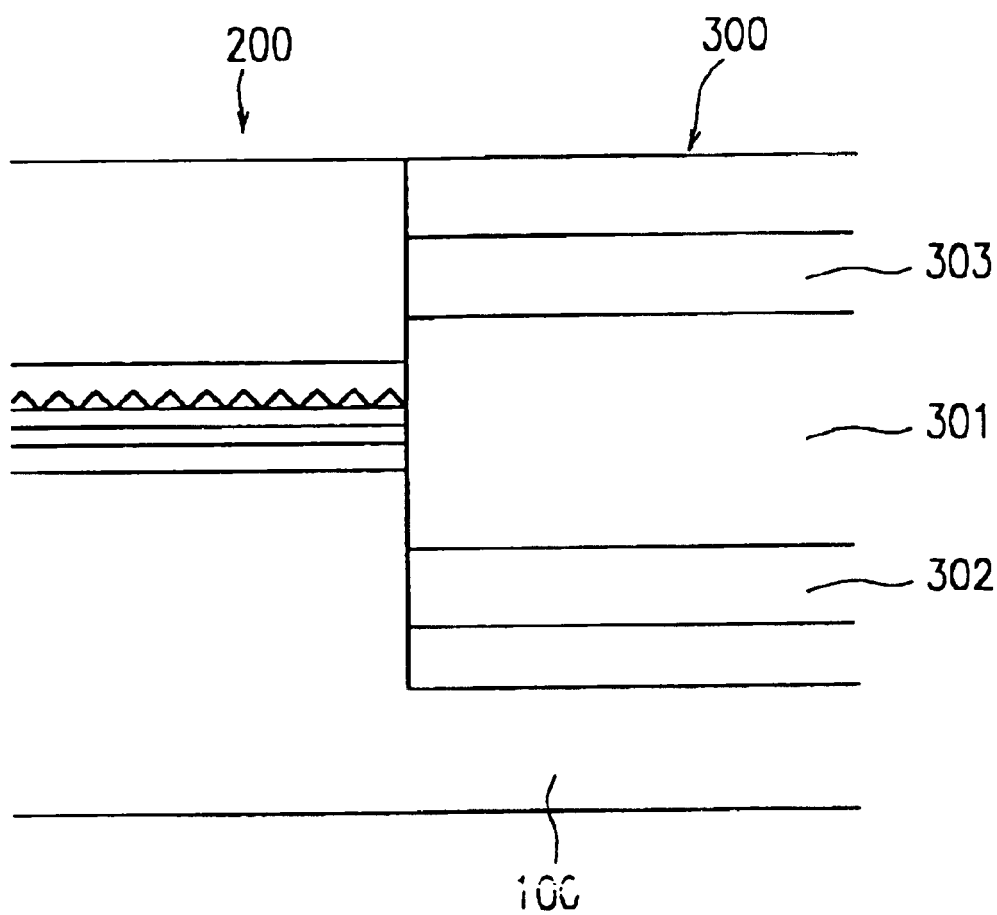
FIGS. 7A and 7B are cross-sectional views illustrating conventional optical integrated circuit devices.
Figure 7B:
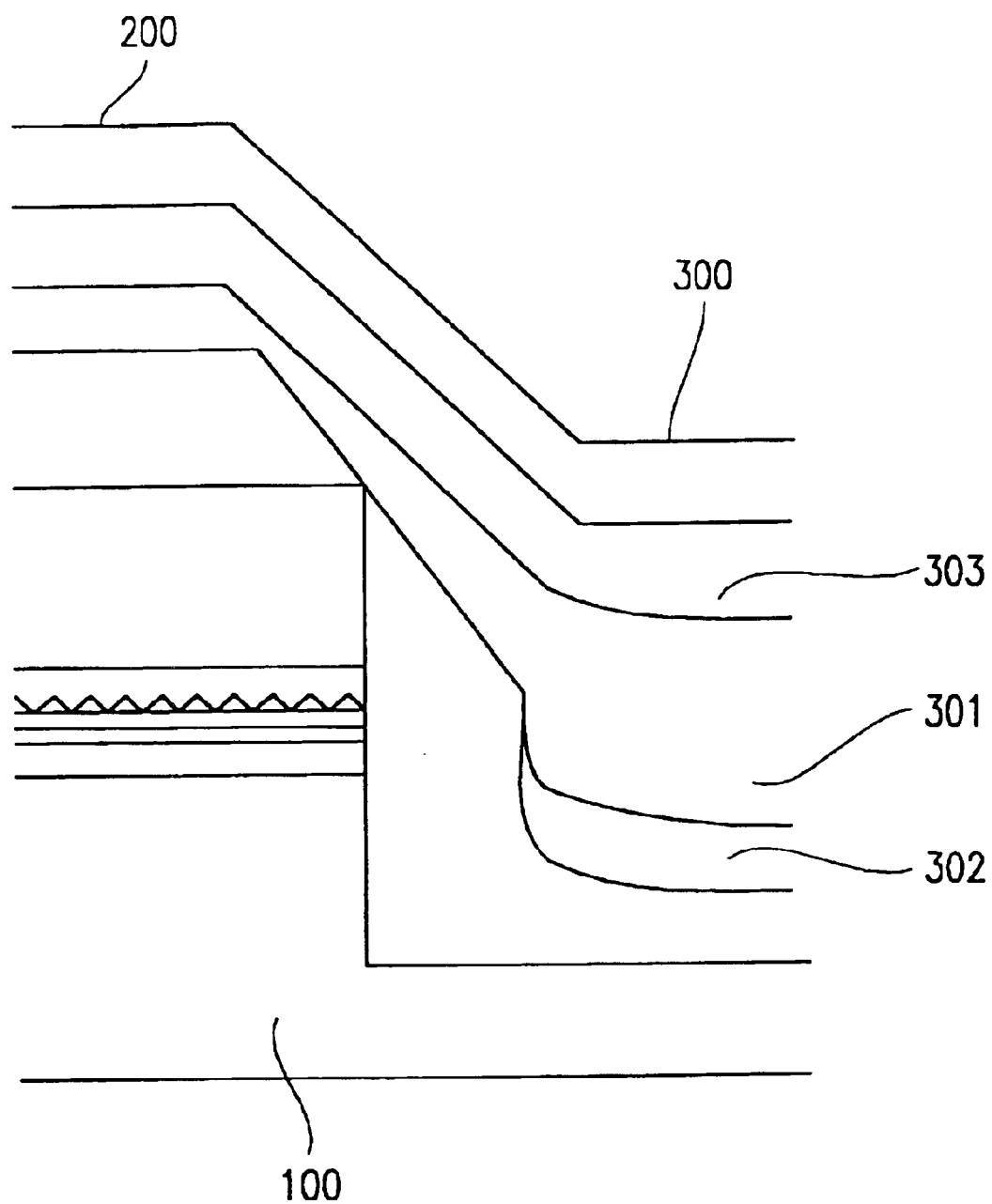

FIGS. 6A and 6B show a semiconductor laser device with a spot-size converter 60 according to Example 6 of the present invention. FIG. 6C is a flowchart of a fabrication method of the laser device 60. The laser device 60 is characterized by a fabrication process and the structure thereof. Hereinafter, the structure of the laser device 60 will be described along with a fabrication process thereof. In Example 6, the present invention is applied to a semiconductor laser device with a spot-size converter including a gain coupling-type distributed-feedback semiconductor laser having an absorptive diffraction grating.

Firstly, semiconductor layers were grown on a GaAs substrate 100 by MOCVD to produce a DFB laser 201 (S601). Specifically, the DFB laser 201 included an active layer composed of a GaInNAs quantum well layer and a GaAs guide layer, and layers made of AlGaAs materials other than the GaInNAs quantum well layer. The beam diameter in the vertical direction of the DFB laser 201 was about 1 $\mu$m. A two-layer quantum well structure was adopted for the active layer, and the oscillation wavelength was set to 1.3 $\mu$m.

Thereafter, the semiconductor layers were vertically etched by RIBE sufficiently deep that the etching reached the substrate 100 (S602). In the etching, a silicon oxide film was used as a mask. A silicon oxide film 6000 was then formed on a side 602 of the etched region as shown in FIG. 6A (S603). The formation was carried out by bins spattering in which spattering was performed over the GaAs substrate 100 in the presence of applied bias voltage.

In this case, substantially no silicon oxide was formed on a base 601 of the etched region. The silicon oxide film 6000 was formed on the side 602 of the etched region. Here the thickness of the silicon oxide film 6000 was 20 nm. Such a thin film 6000 did not cause light to be reflected. At the time, the silicon oxide film 6000 was formed on the side 602 of the etched region and was not formed on the base 601 of the etched region.

As shown in FIG. 6B, a semiconductor layer 300 including a GRIN region 5000 having a structure in which a refractive index varies continuously was grown in the etched region (S604). The refractive index was varied by adjusting molar fractions of In and As. The central position of the GRIN region 5000 was registered with the center of the output light distribution of the DFB laser 201. This registration control was easily realized by computer-controlling the flow rate of a mass flow controller of the MOCVD apparatus.

In the laser device 60, since the dielectric layer (the silicon oxide film 6000) was formed on the side of the etched region, the growth in a direction perpendicular to the side of the etched region was suppressed, whereby substantially no growth toward a direction tilted from a horizontal direction occurred during the growth of the GRIN region 5000. The semiconductor layers were grown while keeping the entire growth surface thereof parallel to the InP substrate 100.

A coupling loss of light from the DFB laser 201 to the GRIN region 5000 was evaluated for the laser device 60. As a result, the coupling loss was about 0.2 dB, which confirmed a large loss reduction. This was because there were substantially no semiconductor layer tilted from a horizontal direction and substantially no mode mismatch.

In Example 6, the number of the crystal growth processes can be reduced by one process as compared with Example 5, thereby reducing cost. However, in Example 6, the beam diameter of emitted light varies depending on at which site the element is cleaved. Therefore, the cleavage should be carefully done.

According to the semiconductor laser device with a spot-size converter of the present invention, the structure in which the semiconductor layer having substantially uniform refractive index is buried in the junction region between the semiconductor laser and the light waveguide. Further, the semiconductor laser device with a spot-size converter does not have a layer structure tilted from the horizontal direction in the junction portion between the semiconductor laser and the light waveguide. Accordingly, wave-guided light substantially is not reflected or refracted at these interfaces, thereby reducing a radiation loss.

As a result, the semiconductor laser device with a spot-size converter of the present invention can have a small coupling loss, a low level of power consumption, and high reliability.

By providing the structure in which the semiconductor layer having a refractive index varying substantially continuously in the layer direction is buried in the junction region between the semiconductor laser and the light waveguide, the mode profile of light transmitted in the waveguide is continuously varied due to the lens effect of the semiconductor layer in such a way that the light is coupled with the waveguide when the beam diameter of the light becomes equal to the beam diameter of the inherent mode of the light waveguide. Therefore, the coupling loss caused by mode mismatch can be more effectively reduced.

By providing a combination of the above-described two configurations, both the effects are synergistically available and the semiconductor laser device with a spot-size converter can reduce more effectively the radiation loan.

When the semiconductor laser device with a spot-size converter does not include a light waveguide, the above effects can be achieved by a small number of growth steps, thereby reducing cost.

By providing the dielectric layer, the above-described effects are synergistically available and the semiconductor laser device with a spot-size converter can reduce more effectively the radiation loss.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A semiconductor laser device with a spot-size converter comprising:
   a semiconductor substrate;
   a semiconductor laser region, and
   a semiconductor layer;
   the semiconductor laser region and the semiconductor layer being integrally formed as one unit on the semiconductor substrate in a lateral direction to emit light from the side of the semiconductor layer;
   the semiconductor layer has a function of changing the spot-size in a layer direction of light emitting from a semiconductor laser by changing a refractive index of the semiconductor layer in the layer direction;
   wherein the semiconductor layer is a graded index to gradually change a refractive index thereof in a layer direction.

2. The semiconductor laser device with a spot-size converter according to claim 1, wherein at a time of passing light emitting from the semiconductor laser region through the semiconductor layer, the spot-size of light is periodically changed or shows a behavior of a portion of the periodical changing.

3. The semiconductor laser device with a spot-size converter according to claim 2, wherein the most highest region of refractive index of the semiconductor layer is one conformed with an approximate central portion of a distribution of light emitting from the semiconductor laser region.

4. The semiconductor laser device with a spot-size converter according to claim 2, wherein on the boundary between the semiconductor layer and the semiconductor laser region, a second semiconductor layer having a substantially constant refractive index is formed.

5. The semiconductor laser device with a spot-size converter according to claim 2, wherein on the boundary between the semiconductor layer and the semiconductor laser region, a dielectric layer is formed.

6. The semiconductor laser device with a spot-size converter according to claim 1, wherein the most highest region of refractive index of the semiconductor layer is one conformed with an approximate central portion of a distribution of light emitting from the semiconductor laser region.

7. The semiconductor laser device with a spot-size converter according to claim 6, wherein on the boundary between the semiconductor layer and the semiconductor laser region, a second semiconductor layer having a substantially constant refractive index is formed.

8. The semiconductor laser device with a spot-size converter according to claim 6, wherein on the boundary between the semiconductor layer and the semiconductor laser region, a dielectric layer is formed.

9. The semiconductor laser device with a spot-size converter according to claim 1, wherein on the boundary between the semiconductor layer and the semiconductor laser region, a second semiconductor layer having a substantially constant refractive index is formed.

10. The semiconductor laser device with a spot-size converter according to claim 1, wherein on the boundary between the semiconductor layer and the semiconductor laser region, a dielectric layer is formed.

11. A semiconductor laser device with a spot-size converter comprising:
    a semiconductor substrate;
    a semiconductor laser region;
    a light waveguide region;
    the semiconductor laser region and the light waveguide region being integrally formed as one unit on the semiconductor substrate in a lateral direction to emit light from the light waveguide region;
    at a joint region between the semiconductor laser region and the light waveguide region, a semiconductor layer is buried therein;
    wherein the semiconductor layer has a refractive index which is substantially constant.

12. The semiconductor laser device with a spot-size converter according to claim 11, wherein the most highest region of refractive index of the semiconductor layer is one conformed with an approximate central portion of a distribution of light emitting from the semiconductor laser region, and with an approximate central portion of an intrinsic mode of the light waveguide region.

13. The semiconductor laser device with a spot-size converter according to claim 12, wherein on the boundary between the semiconductor layer and the semiconductor laser region and/or the boundary between the semiconductor layer and the light waveguide region, another semiconductor layer having a refractive index which is substantially constant is formed.

14. The semiconductor laser device with a spot-size converter according to claim 12, wherein on the boundary between the semiconductor layer and the semiconductor laser region and/or the boundary between the semiconductor layer and the light waveguide region, a dielectric layer is formed.

15. The semiconductor laser device with a spot-size converter according to claim 11, wherein on the boundary between the semiconductor layer and the semiconductor laser region and/or the boundary between the semiconductor layer and the light waveguide region, another semiconductor layer having a refractive index which is substantially constant is formed.

16. The semiconductor laser device with a spot-size converter according to claim 11, wherein on the boundary between the semiconductor layer and the semiconductor laser region and/or the boundary between the semiconductor layer and the light waveguide region, a dielectric layer is formed.

17. A semiconductor laser device with a spot-size converter comprising:

a semiconductor substrate;

a semiconductor laser region;

a light waveguide region;

the semiconductor laser region and the light waveguide region being integrally formed as one unit on the semiconductor substrate in a lateral direction to emit light from the light waveguide region;

at a joint region between the semiconductor laser region and the light waveguide region, a semiconductor layer is buried therein;

wherein the semiconductor layer has a refractive index which is changed continuously in a layer direction or varied step wise.

18. The semiconductor laser device with a spot-size converter according to claim 17, wherein on the boundary between the semiconductor layer and the semiconductor laser region and/or the boundary between the semiconductor layer and the light waveguide region, another semiconductor layer having a refractive index which is substantially constant is formed.

19. The semiconductor laser device with a spot-size converter according to claim 17, wherein on the boundary between the semiconductor layer and the semiconductor laser region and/or the boundary between the semiconductor layer and the light waveguide region, a dielectric layer is formed.

* * * * *